Figure 1:
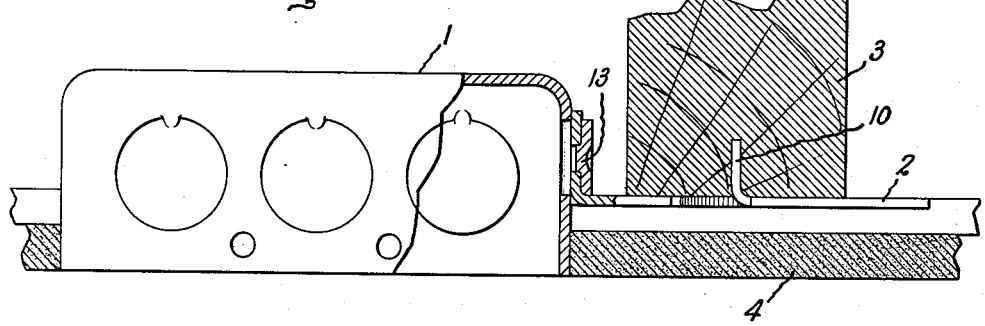

March 2, 1954     E. B. CLARK     2,670,915
SUPPORT BRACKET
Filed June 23, 1951

Inventor:
Edward B. Clark,
by his Attorney.

Patented Mar. 2, 1954

2,670,915

UNITED STATES PATENT OFFICE 2,670,915

SUPPORT BRACKET

Edward B. Clark, Milford, Conn., assignor to General Electric Company, a corporation of New York Application June 23, 1951, Serial No. 233,201

1 Claim. (Cl. 248—27)

This invention relates to mounting brackets and, in particular, to an improved bracket for supporting electrical boxes, of which one example would be an outlet box.

While for convenience the term "outlet box" is used in the following description, it is to be realized that this invention is not limited to outlet boxes, rather is it intended to cover all that group of electrical conduit and cable boxes which includes, in part, outlet boxes, switch boxes, and junction boxes.

In the electrical industry diligent efforts are being made to simplify outlet box installations—the theory being that the electrician's time should not be spent securing boxes to suitable supports. One device for this simplification is a bracket secured to an outlet box which permits the electrician to install a box merely by nailing the bracket to a support. Conventionally, these brackets are formed to position the outlet box properly relative to the finished wall.

While a mounting bracket unquestionably saves an electrician's time, it has been found that other workmen occasionally destroy the installations made by the electrician. For example, a carpenter, in putting wallboard in a house, could position the wallboard against a bracket supported outlet box and hit the board with a hammer to either mark or cut out the board properly to fit over the outlet box. In fitting a wallboard in this manner, the carpenter might knock the box loose from its mounting bracket, thereby requiring the electrician to do a job over. Obviously, electricians are not satisfied with such a situation. Consequently, the connection between a mounting bracket and an outlet box is of great commercial importance.

Various means, including welding, have been employed for securing a mounting bracket to a box, but a problem does exist with welded boxes in that a satisfactory weld is not produced if the materials to be welded are not of the proper composition or are not properly pre-cleaned. Since proper supervision cannot be given to the welding of every mounting bracket to an outlet box, poor welds can be made without detection. Consequently, electricians are not generally satisfied with boxes having welded support brackets.

It is an object of this invention, therefore, to provide a new and improved means for securing a bracket to an outlet box.

It is a further object of this invention to provide a new non-welded connection between an outlet box and its mounting bracket.

It is a still further object of this invention to provide an improved non-welded connection between a mounting bracket and outlet box which is acceptable to the industry and which meets the Underwriters Laboratories Inc. requirements for listing.

Further objects and advantages of this invention will become apparent and the invention will be more clearly understood from the following description, referring to the accompanying drawing, and the features of novelty which characterize this invention will be pointed out with particularity in the claim annexed to and forming a part of this specification.

Briefly, this invention comprises a mounting bracket having a bent-down projection and an outlet box having a lancing in one side thereof. The bracket projection is inserted into the lancing which in turn is smashed back down on the tang to rigidly secure the bracket to the box.

Figure 2:
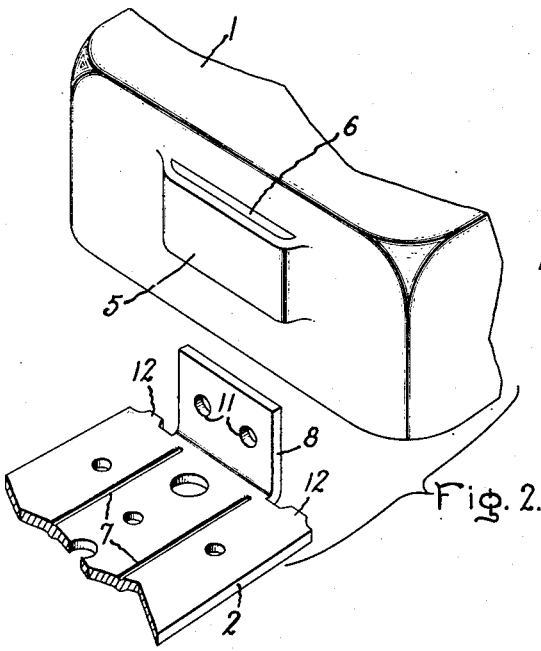
Figure 3:
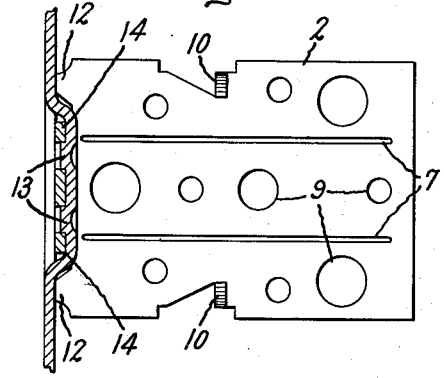
Figure 4:
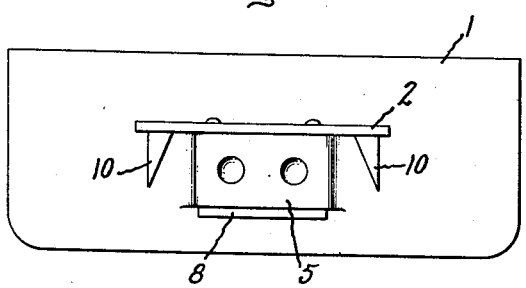

In the drawing, Fig. 1 is a top elevation partially cut-away showing an outlet box supported on a stud in a wall structure; Fig. 2 is an exploded perspective view of a mounting bracket and outlet box; Fig. 3 is a bottom elevation of the mounting bracket and a portion of the side of the outlet box to which it is secured, and Fig. 4 is an end elevation of the mounting bracket and outlet box.

Referring to the drawing, an outlet box 1 of a conventional form is shown having a mounting bracket 2 which is secured to a stud 3. A wallboard or covering of plaster 4 is shown forming a finished wall about the outlet box.

Box 1 is shown provided in one side thereof with a lancing 5 which is driven up from inside the box to expose an opening or channel 6 of a size compatible with dimensions of bracket 2.

It is to be noted that the position of lancing 5 relative to the edge of box 1 is determined by the thickness of the outer covering of the wall 4 in which the box is to be positioned, i. e. the lancing can be positioned either near the edge or bottom of the box depending upon whether a thin or thick wall finish is to be used.

Mounting bracket 2 in one form is a strip of sheet metal formed with stiffening ribs 7 and having a bent-down projection 8 engageable with the opening 6 formed by the lancing 5. Bracket 2 has a plurality of mounting and plaster securing holes 9 for adjustably positioning the box relative to a stud 3. The bracket further has a pair of bent-down spikes 10 which are bent out of the plate and which can be used for driving bracket 2 into engagement with the studding.

Projection 8 is provided with a pair of holes 11 which are used to engage a portion of the lancing 5 when the latter is smashed into engagement with the tang 8, as hereinafter described. It is interesting to note that projection 8 is so bent away from bracket 2 that a pair of shoulders 12 are left in that plane, including the surface of tang 8 in engagement with the side of the box 1. Shoulders 12 act as stops to prevent twisting of bracket 2 relative to the box 1.

After bracket 2 has been placed in engagement with box 1, with projection 8 passing into the channel 6 under lancing 5, the combination is then placed in a punch press which smashes the lancing 5 back towards box 1 and punches a pair of indents 13 from lancing 5 into openings 11 in projection 8.

The punch press blow also tends to drive the lancing 5 back into close engagement with projection 8 at the corners 14 to provide a secure and rigid engagement between the bracket and side of the box.

This structure has been found to meet the severe rigid tests of the Underwriters Laboratories Inc. and, furthermore, it has been found to meet the requirements set forth by the electricians.

Modifications of this invention will occur to those skilled in the art and it is desired to be understood, therefore, that this invention is not to be limited to the particular embodiment disclosed, but that the appended claim is meant to cover all the modifications which are within the spirit and scope of invention.

What I claim as new and desire to secure by Letters Patent of the United States is:

In combination, a metal outlet box and mounting means therefor, comprising a struck-out lancing in a side wall of the box defining a channel, a sheet metal support bracket having a stud-engaging portion and an angularly projecting box-engaging portion of substantially same width as said channel and which extends through and beyond said channel and which has spaced cavities therein, said channel formation being pressed into permanent gripping engagement with the said projecting portion, and the lancing being provided with indents formed on its inner surface to interlock with said cavities, and said support bracket being further provided with spaced shoulders engaging the side wall of the box at both sides of the projecting portion, whereby the bracket is rigidly secured to the box and is prevented from twisting relative to the box.

EDWARD B. CLARK.

References Cited in the file of this patent

UNITED STATES PATENTS

| Number | Name | Date |
| --- | --- | --- |
| 614,503 | Sackett | Nov. 22, 1898 |
| 965,275 | Birtwhistle | July 26, 1910 |
| 1,026,164 | Hoffman | May 14, 1912 |
| 1,240,863 | Lyda | Sept. 25, 1917 |
| 1,435,711 | Kruse | Nov. 14, 1922 |
| 1,456,385 | Kvarnstrom | May 22, 1923 |
| 1,621,536 | Handte | Mar. 22, 1927 |
| 1,718,878 | Raquette | June 25, 1929 |
| 2,480,805 | Buckels | Aug. 30, 1949 |